(No Model.)

2 Sheets—Sheet 1.

O. PECK.

BREAST DRILL.

No. 295,193. Patented Mar. 18, 1884.

Witnesses:
Dana Malone
Gorham D. Williams

Inventor.
Obed Peck
By Henry Wenn
Attorney

N. PETERS. Photo-Lithographer, Washington, D. C.

(No Model.) 2 Sheets—Sheet 2.

O. PECK.

BREAST DRILL.

No. 295,193. Patented Mar. 18, 1884.

Witnesses:
Dana Malone
Gorham D. Williams

Inventor.
Obed Peck
by Henry Winn
Attorney

N. PETERS. Photo-Lithographer, Washington, D. C.

UNITED STATES PATENT OFFICE.

OBED PECK, OF ROWE, MASSACHUSETTS.

BREAST-DRILL.

SPECIFICATION forming part of Letters Patent No. 295,193, dated March 18, 1884.

Application filed October 5, 1881. (No model.)

*To all whom it may concern:*

Be it known that I, OBED PECK, of Rowe, in the county of Franklin and State of Massachusetts, have invented certain new and useful Improvements in Breast-Drills, whereof the following is a specification, reference being had to the accompanying drawings, in which—

Figure 2:
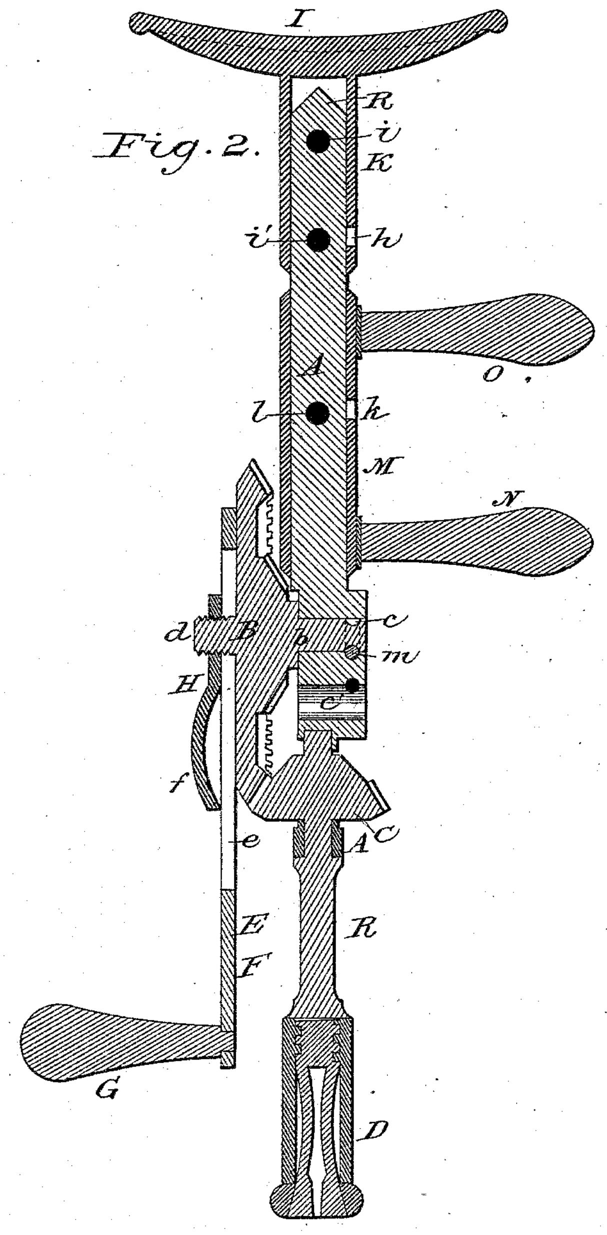
Figure 1:
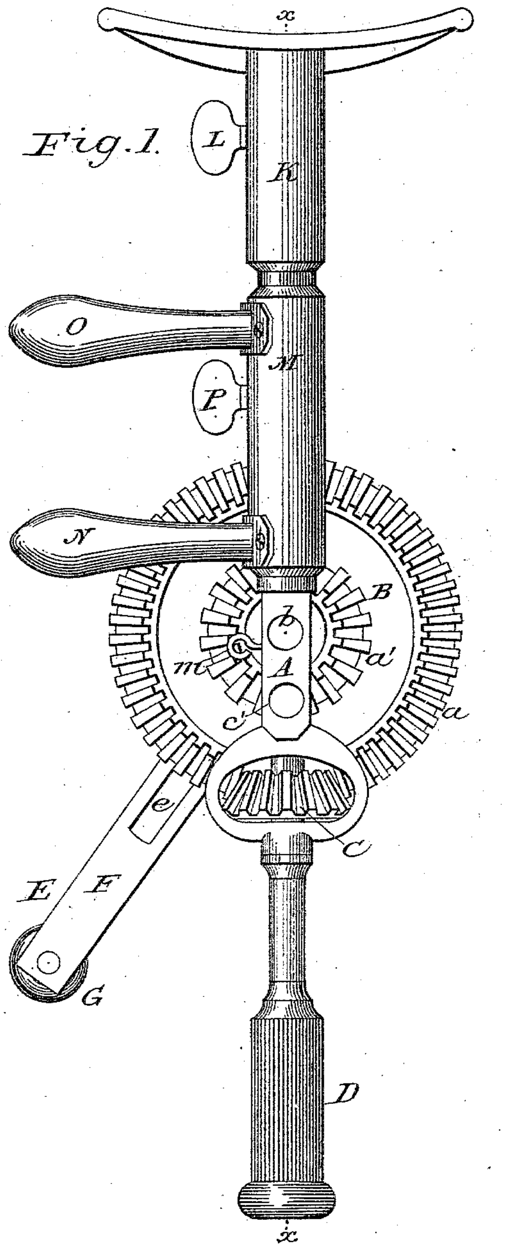
Figure 3:
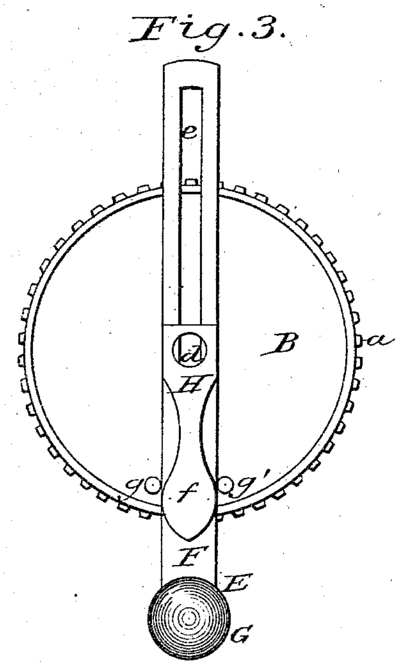
Figure 4:
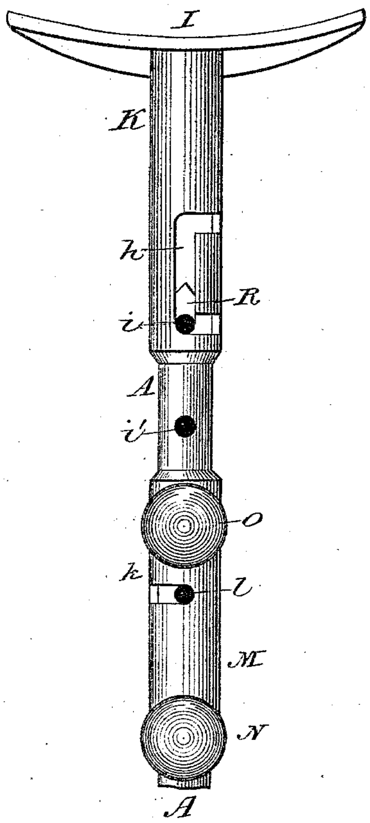

Figure 1 is a view in elevation of my improved breast-drill with the breast-bearing, hand-hold, and hand-rest turned as in use for a ratchet-brace. Fig. 2 is a vertical section of the same turned partly around, taken through the line $x$ $x$ of Fig. 1, after the breast-bearing, hand-hold, and hand-rest and parts attached have been turned a quarter-turn on the frame of the drill. Fig. 3 shows the driving-gear wheel and crank as attached thereto. Fig. 4 shows the breast-bearing, hand-hold, and hand-rest and the parts attached thereto in position on the cylindrical part of the frame.

A is the frame of my drill, having a main drive-wheel, B, on which are cut two sets of gears, $a$ and $a'$, at different distances from the common axis, and adjusted to take into the bevel-gear of the gear-wheel C, according as the axial shaft $b$ of the wheel B is placed in the one or the other of the bearings $c$ or $c'$ in the frame A, adjusted to receive said axial shaft in such positions that when it is in the bearing $c$ the gear $a$ connects with the bevel-gear of the wheel C, and when in the bearing $c'$ the gear $a'$ connects therewith, the purpose of the mechanism being to multiply the speed of the boring-tool used if the outer gear, $a$, is connected, and increase the power upon it if the inner gear, $a'$, is connected.

I use the term "gear" in this specification to designate the system of gear-teeth cut on a gear-wheel, not in the usual sense, which includes both teeth and wheel. When both are included, the term "gear-wheel" is adopted.

The chuck D, which may be of any construction suitable to hold a boring-tool, is attached to the shaft K', which is connected to and rotated by the bevel-gear wheel C, and works in a bearing in frame A.

Attached to the gear-wheel B is the threaded projection $d$, which fits in an elongated slot, $e$, in the part F of the crank E, thereby allowing the part or handle G of said crank to be fastened to the wheel B at different distances from the axis of said wheel by the thumb-nut H, which is threaded to work on the threaded projection $d'$, and the said two threaded parts have their threads so cut relatively to each other and the thickness of the part F that when the thumb-nut H is tightened down upon the crank in its place the lever $f$ of said thumb-nut lies lengthwise of the part F, and the crank is fastened firmly to the wheel, wherever the projection $d$ may be in the slot $e$. Besides clamping it on the projection $d$, the crank is further stayed by the pins $g$ $g'$ in wheel B.

At the end of the frame A opposite the chuck is the breast-bearing I, attached to a tube, K, which fits onto and moves back and forth upon the cylindrical part of said frame, and has a bayonet-slot, $h$, through which passes the thumb-screw L when screwed into the screw-hole $i$. By this device the said breast-bearing I may be drawn out to elongate the tool, as shown in Fig. 4, or turned a quarter-turn and fastened firmly in place by setting the thumb-screw L. The screw-hole $i'$ is supplementary, and is unnecessary if the part of slot $h$ longitudinal with the tube is used; but it illustrates an alternate method of extension, which may be made with a simple cross-slot, like the one shown in the tube M, by putting the set-screw or a pin through it into the screw-hole $i$ or $i'$, as desired; and, obviously, either of the tubes shown may be located and fastened to any desired position on the frame by a pin or set-screw working through a hole in it into holes located, as desired, in the frame, or vice versa.

The tube M also surrounds the cylindrical portion of the frame A, and to it are attached the hand-hold N and the rest O, intended to steady the tool when the other hand or wrist is operating the tool. In the tube M is also a cross-slot, $k$, through which passes the thumb-screw P into the screw-hole $l$. This screw, when loosened, allows the rest and hand-hold to be turned a quarter-turn on the axis of frame A. The shaft $b$ is held in its place in its bearing $c$ or $c'$ by a pin, $m$, passing through holes in the frame into the bearing and through a groove in said shaft. The end of the frame A is shaped into the form of the wedge R, and the bearing I and tube K are removable from the frame for convenient application of a lever or other mechanism when a heavy pressure is required on the boring-tool.

Obviously the crank E may also be adjusted on the wheel B by a series of holes or openings made in the part F at different distances from the part G, through different ones of which the part $d$ or other projections on the wheel B may be adjusted to set the handle G in different positions required; or the holes or openings may be in the wheel B at different distances from its axis, with one or more projections from the part F to fit into the same. After being located, the handle may be fastened by a nut, a key, or other device. Obviously, also, the projection $d$ might be a part of the thumb-nut H to be screwed into a socket tapped to receive it in the wheel B.

The tube M may also be dispensed with, and the hand-hold N and rest O, either separate or rigidly connected together, may be provided with pins or screws projecting from them, or their connecting part fitting into holes made in the frame A in the various positions where they are required to be located, into which the projecting pins or screws may be set or screwed, as desired; or the projections may pass entirely through the frame A and be fastened by nuts attached to the ends thereof (which have been threaded for the purpose) on the opposite side of the frame; or the screws or pins may be on the frame projecting or screwed into holes in the hand hold or rest.

The operation of the tool is obvious: When required for use as an ordinary boring implement, the hand-hold N, hand-rest O, and breast-bearing I are fastened into the position indicated in Fig. 2. When needed to bore a hole close to an obstacle—as, for example, in a floor close to the wall—the same parts are turned and fastened into the position shown in Fig. 1, when the position of each of said parts forms a radial angle of about ninety degrees with its former position shown in Fig. 2; and if the breast-bearing I is too wide, it may be removed entirely and replaced by a lever or other device. In such use the hand-hold N and rest O, though inconveniently placed for the grasp of the hand, will bring up against the wall and perform the function of preventing the frame from turning with the boring-tool as it is forced in. The principal purpose of the extension of the breast-bearing I to a greater distance from the axis of the wheel B is to enable the handle G to be extended or located farther from that axis without striking the breast-bearing, and also to allow the operator to turn the handle when thus extended, to give great leverage without the inconvenience of having it come close against his breast, and with free use of the arm.

Breast-drills, though less likely than bit-braces to be twisted out of the axis of the hole being drilled, and allowing a freer use of the arm, have not replaced bit-braces, because a handle suitable for running small drills with great speed could not conveniently run a bit where considerable power was required, and a tool large enough for that was cumbersome. To overcome this difficulty, bit-braces have been made with varying sweeps from six to fourteen inches. Breast-drills, being more expensive, could not replace one or two sizes of the bit-brace; but the object of my invention is to furnish a tool which will perform all the functions of many sizes, and thus replace a variety of tools. The device is intended, as seen, for use in place of the common brace—the brace that multiplies the rotation of its crank, the common ratchet-brace, and the heavy ratchet-drill.

The torsion of the frame A is severe when the boring-tool is driven by the greater power produced by the extension of the crank and removal of the handle G farther from its axis. To meet this I have adopted the form of breast-bearing used in many breast-drills, and shown in the drawings, instead of the circular form sometimes used, and made it large, because the broad bearing across the breast of the operator enables him not only to give the greater pressure required to advance the boring-tool, but to hold the frame A firmly from torsion, and I have added the hand-rest O to the hand-hold N as a further assistance therefor, as well as a rest to the hand in holding the tool.

I am aware that the extension-handle has been used with metal-drills where the frame in which the boring-tool worked has been rigidly fastened to the bench of a machine-shop and the drill advanced by feed mechanism or screws, the purpose being to overcome the torsion caused by the greater leverage of handle; but I have found the devices described sufficient for the purpose.

The breast-bearing I may be adjusted to the end of the frame A at different angles by making a socket in it or in the frame A, fitting a projection on the frame A or on it in different positions at the angles required, and fastening the parts together by a screw or other device which will allow said bearing to be detached from one position to assume another and be held in the several positions by the form of the projection in the socket or the fastening device.

What I claim as my invention, and for which I pray Letters Patent, is—

1. The breast-bearing I, combined with and attached to the frame A, and adjustable on said frame at different distances from the bearing $c$ or $c'$ of the gear-wheel B therein, combined with the wheel B, and a crank, E, attached to said wheel, which crank has its handle G adjustable, as described, at different distances from the axis about which it rotates.

2. The breast-bearing I, combined with the frame A, and adjustable thereto in positions which form one or more radial angles with each other, as described, for the purposes described.

3. In a breast-drill, the hand-hold N, combined with the frame A, and adjustable thereto at different radial angles, as described, for the purposes described.

4. The frame of a breast-drill, having a hand-hold, N, attached, and a breast-bearing, I, and a hand-rest, O, located on and attached to said frame at a point between the hand-hold and the breast-bearing.

5. The crank E, attached to the driving-wheel B, and having its handle G adjustable, as described, at different distances from its axis of rotation, said driving-wheel having the gears *a a'*, and combined with the bevel-gear wheel C, shaft R, chuck D, and the frame A, having the bearings *c c'*, adapted interchangeably to receive the shaft of the wheel B in positions to bring the gear *a* or *a'* into engagement with the gear-wheel C.

OBED PECK.

In presence of—
A. M. WILSON,
CHAS. H. SCOTT.